(12) United States Patent  (10) Patent No.: US 8,448,901 B2
Porte et al.  (45) Date of Patent: May 28, 2013

(54) AIRCRAFT NACELLE INCLUDING HOT AIR DISCHARGE MEANS

(75) Inventors: Alain Porte, Colomiers (FR); Gilles Chene, Toulouse (FR); Arnaud Hormiere, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 334 days.

(21) Appl. No.: 12/745,953

(22) PCT Filed: Dec. 1, 2008

(86) PCT No.: PCT/FR2008/052164
§ 371 (c)(1),
(2), (4) Date: Aug. 23, 2010

(87) PCT Pub. No.: WO2009/077688
PCT Pub. Date: Jun. 25, 2009

(65) Prior Publication Data
US 2010/0314082 A1  Dec. 16, 2010

(30) Foreign Application Priority Data
Dec. 3, 2007 (FR) ..................................... 07 59493

(51) Int. Cl.
*B64D 15/02* (2006.01)
(52) U.S. Cl.
USPC ....................................................... 244/134 B
(58) Field of Classification Search
USPC .................. 244/135 R, 135 B, 130, 206, 207, 244/53 R
See application file for complete search history.

(56) References Cited

U.S. PATENT DOCUMENTS

| 3,889,903 A | 6/1975 | Hilby | |
| 3,933,327 A | 1/1976 | Cook et al. | |
| 4,154,256 A | 5/1979 | Miller | |
| 4,674,714 A * | 6/1987 | Cole et al. | 244/134 B |
| 4,738,416 A * | 4/1988 | Birbragher | 244/134 B |
| H648 H * | 7/1989 | Tran | 244/134 B |
| 5,088,277 A | 2/1992 | Schulze | |
| 5,390,878 A * | 2/1995 | Padden | 244/53 R |
| 6,427,434 B2 * | 8/2002 | Porte et al. | 60/39.093 |
| 6,848,656 B2 * | 2/2005 | Linton | 244/134 C |
| 7,931,235 B2 * | 4/2011 | Zanarelli et al. | 244/134 B |
| 8,047,470 B2 * | 11/2011 | Porte | 244/134 B |

FOREIGN PATENT DOCUMENTS

GB  1 210 202  10/1970

OTHER PUBLICATIONS

International Search Report dated Jul. 6, 2009, from corresponding PCT application.

* cited by examiner

*Primary Examiner* — Tien Dinh
*Assistant Examiner* — Keith L Dixon
(74) *Attorney, Agent, or Firm* — Young & Thompson

(57) ABSTRACT

The invention relates to an aircraft nacelle that comprises a discharge means (50) for establishing a communication between the inside of the nacelle and the outside thereof, and a junction area between two members (54, 56), and at which the two members are superimposed, both members each having a surface defining the outer surface of the nacelle on either side of the junction area, characterized in that said discharge means (50) includes a dual-portion shim (52), i.e. a first portion provided between the superimposed panels and including at least one protruding and/or recessed member for forming a passage between said panels in order to establish a communication between the inside and the outside of the nacelle, and a second portion at the level of only one panel, i.e. that located inside at the junction area, in order to protect the same against excessive temperatures.

14 Claims, 6 Drawing Sheets

AIRCRAFT NACELLE INCLUDING HOT AIR DISCHARGE MEANS

This invention relates to an aircraft nacelle that comprises means for discharging hot air that is used in particular for de-icing the lip of the air intake of said nacelle.

To limit the impact of noise pollution in the vicinity of airports, the international standards are increasingly restrictive as far as sound emissions are concerned.

Techniques have been developed to reduce the noise that is emitted by an aircraft, in particular by arranging, at pipe walls of the nacelles, coatings that are intended to absorb a part of the sound energy, in particular by using the principle of Helmholtz resonators. In a known manner, this acoustic coating comprises—from the outside to the inside—an acoustically resistive porous layer, an alveolar structure, and a reflective layer that is impermeable to sound waves so that the coating is effective.

For the moment, because of various constraints, for example of shaping or compatibility with other equipment, the extent of treated surfaces is limited. Thus, the coating is not very compatible with the systems that make it possible to prevent the formation and/or the accumulation of ice and/or frost that are necessary in these zones.

These systems are divided into two large families, the first called defrosting systems that make it possible to limit the formation of ice and/or frost, and the second called de-icing systems that limit the accumulation of ice and/or frost and that act on both the ice and/or the frost that is formed. Hereinafter, a frost treatment system or process is defined as a defrosting system or process or a de-icing system or process.

This invention relates more particularly to a frost treatment process that consists in using the hot air that is taken from the engine and fed back at the inside walls of the leading edges.

Figure 1:
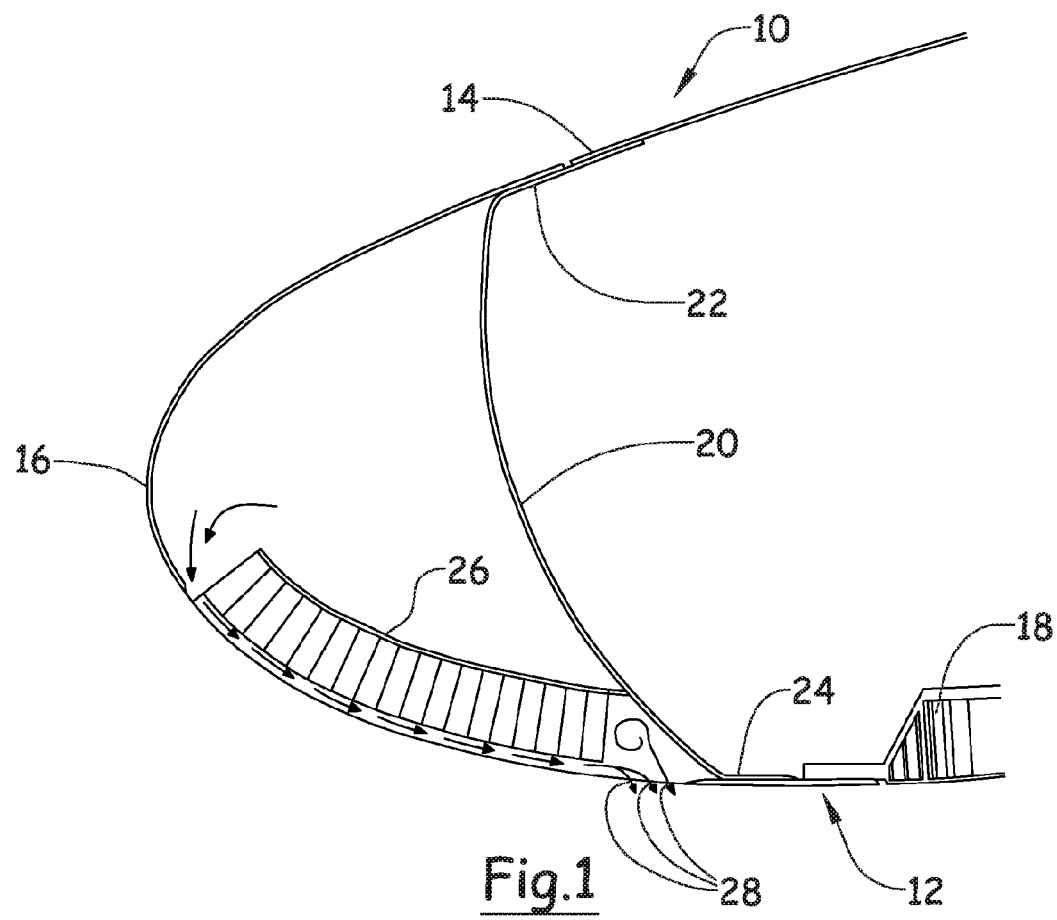

According to one embodiment that is illustrated in FIG. 1, a nacelle 10 comprises at least one pipe 12, a peripheral wall 14, and, at the front, an air intake that is delimited by a lip 16 that connects the pipe 12 and the peripheral wall 14.

In a known manner, the pipe 12 comprises a coating 18 for the acoustic treatment that comprises—from the inside to the outside—a reflective layer, at least one alveolar structure, and at least one acoustically resistive structure.

To reinforce the structure of the nacelle, a front frame 20 connects the pipe 12 and the peripheral wall 14, whereby the lip 16 is made integral with said front frame 20.

According to one embodiment, to ensure the connection between the panel that forms the lip 16 and the panel that forms the peripheral wall 14, the edges of said panels are flattened and then attached by any suitable means against a flange 22 of the front frame 20.

According to one embodiment for ensuring the connection between the panel that forms the lip and one of the panels that delimits the pipe 12, the edges of said panels overlap and are kept flattened against one another by any suitable means. As illustrated in FIG. 1, the front frame 20 comprises a flange 24 against which the inside surface of the panel of the lip is flattened and attached by any suitable means.

The junction zone that corresponds to the panel overlapping zones constitutes the surface that is not treated acoustically.

Advantageously, a coating 26 for the acoustic treatment at least partially covers the surface of the lip.

In addition, means are provided for injecting hot air at the lip, whereby the hot air originates from the power plant. Means, for example channels, are provided at the inside surface of the wall of the lip to keep the hot air against said wall. As described in Patent Application FR-070055586, these channels are interposed between the alveolar structure and the acoustically resistive structure of the coating 26 for the acoustic treatment.

Means for discharging hot air are provided for ejecting it beyond the structure of the nacelle into the pipe 12, as illustrated in FIG. 1.

According to one embodiment, the discharge means come in the form of perforations or micro-perforations 28 that are made at the wall of the lip.

According to a first drawback of this embodiment, the surface of the zone that is occupied by the discharge means that are not treated acoustically is added to the surface of the junction zone, also untreated, which does not make it possible to optimize the acoustic treatment.

According to another drawback, the micro-perforations in the sheet metal of the lip provide little support for the through circulation of the hot air, which tends to generate microcrack phenomena, thereby considerably shortening the service life of the air intake.

Finally, according to another constraint, the outside skin of the coatings for the acoustic treatment being made of heat-sensitive composite material, the discharge means should be positioned in a suitable manner relative to the zones that are treated acoustically so as to limit the risks of burns of the composite.

The document U.S. Pat. No. 5,088,277 describes another embodiment of the discharge means. According to this document, the front frame comprises, in the central part, a support surface against which the wall that forms the lip is flattened. To form the discharge means, the wall that forms the lip comprises bulges at the junction zone with the front frame. Thus, at the discharge means, the wall that forms the lip is separated from the front frame to allow the hot air that is discharged to pass parallel to the surface of the pipe. According to this embodiment, the outside surface of the wall that forms the pipe comes into the extension of the support surface of the front frame so that there is an offset between the surface of the pipe and the surface of the lip even in the zones beyond the bulges.

This embodiment is not satisfactory for the following reasons:

These discharge means generate significant aerodynamic disturbances on the flow of air circulating in the pipe of the nacelle. Actually, the bulges constitute projecting shapes relative to the surfaces of the pipe and the lip that can generate aerodynamic disturbances that are not permissible for the power plant or the fan arranged downstream.

These disturbances are all the more problematic since the de-icing system has a point operation whereas the bulges continually disturb the flow of air that circulates in the pipe of the nacelle.

According to another drawback, the offset between the surface of the pipe and the surface of the lip leads to a surface defect that also generates aerodynamic disturbances.

Finally, whereby the flow of hot air is discharged parallel to the surface of the pipe, it runs the risk of burning the composite materials that are used for the acoustic treatment of the surface of the pipe. Also, as illustrated in the document U.S. Pat. No. 5,088,277, the coating for the acoustic treatment is separated from the discharge means; this tends to reduce the surface that is treated acoustically.

Also, the purpose of this invention is to overcome the drawbacks of the prior art by proposing a nacelle that incorporates a system for discharging the hot air that is used for de-icing, making it possible to optimize the acoustic treatment by increasing the treated surfaces without, however, generating aerodynamic disturbances that are too significant.

For this purpose, the invention has as its object an aircraft nacelle that comprises discharge means that make it possible to link the inside with the outside of the nacelle and a junction zone between two elements at the level of which the two elements are superposed, whereby the two elements each have a surface that forms the outside surface of the nacelle on both sides of the junction zone, characterized in that said discharge means comprise a two-part block, a first part inserted between the superposed panels that comprises at least one projecting and/or hollow element that makes it possible to provide a passage between said panels so as to link the inside and the outside of the nacelle, and a second part to the right of a single panel, the latter arranged inside at the level of the junction zone so as to protect it from an excessive temperature.

Thus, the system for discharging hot air makes it possible to protect the coating that is used for the acoustic treatment by limiting the risks of contact of said coating with excessively hot air.

Preferably, the discharge means have suitable shapes making it possible to eject hot air in a direction that is not parallel to the outside surface of the nacelle so as to mix it with the aerodynamic flows that circulate in the pipe and to cool it. The angle for ejecting hot air is determined so as to achieve a compromise between the cooling of said hot air and the aerodynamic disturbances that are produced by said hot air flow on the aerodynamic flows that circulate in the pipe.

Figure 2:
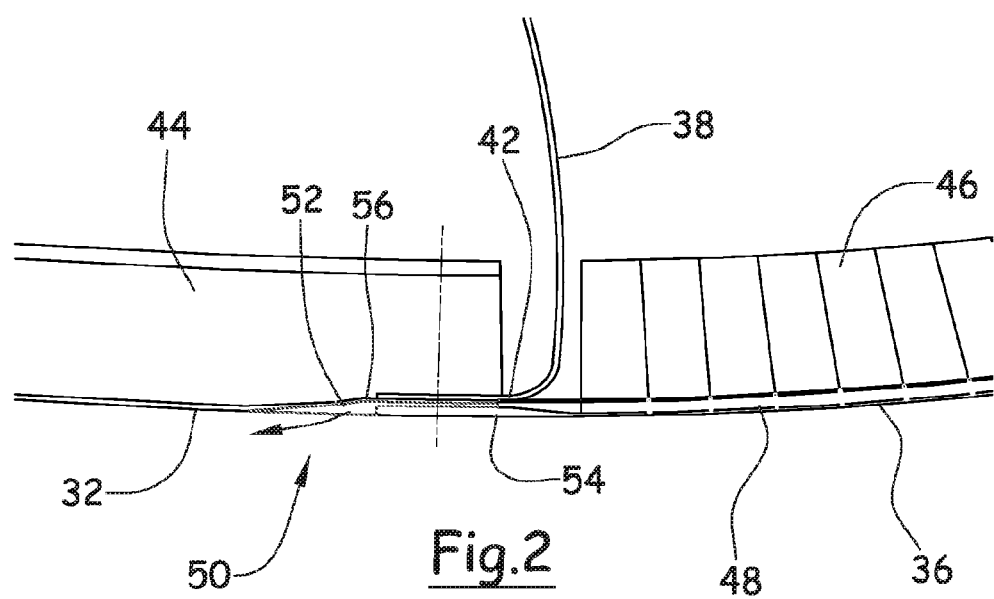
Figure 3:
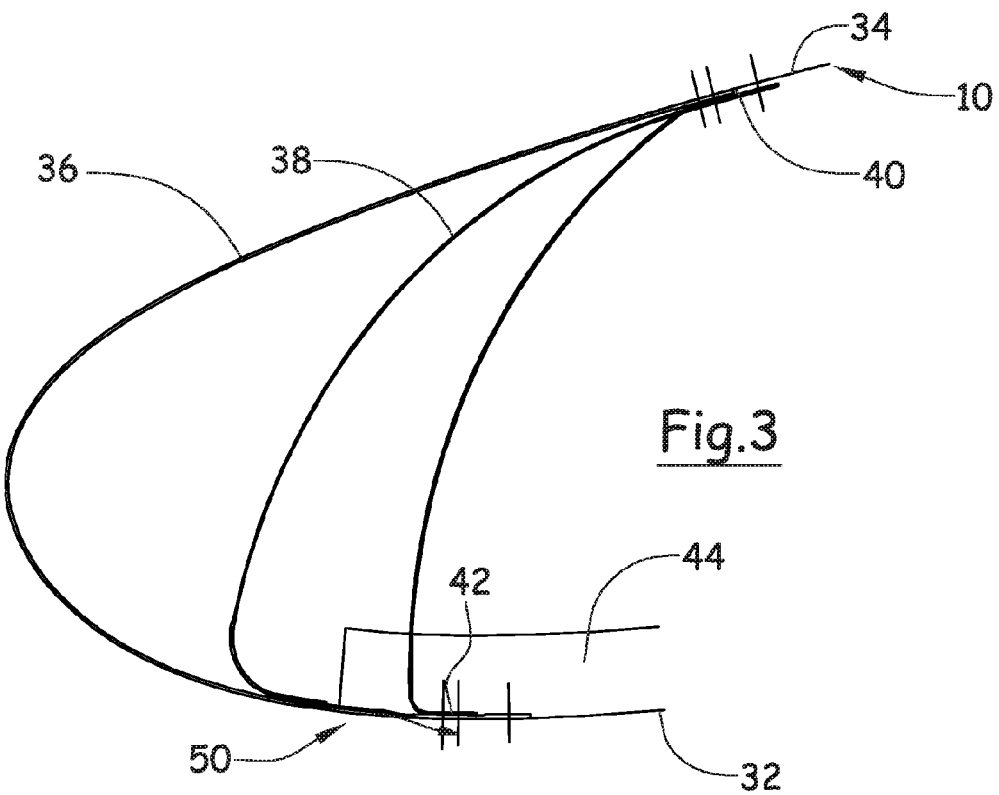
Figure 4:
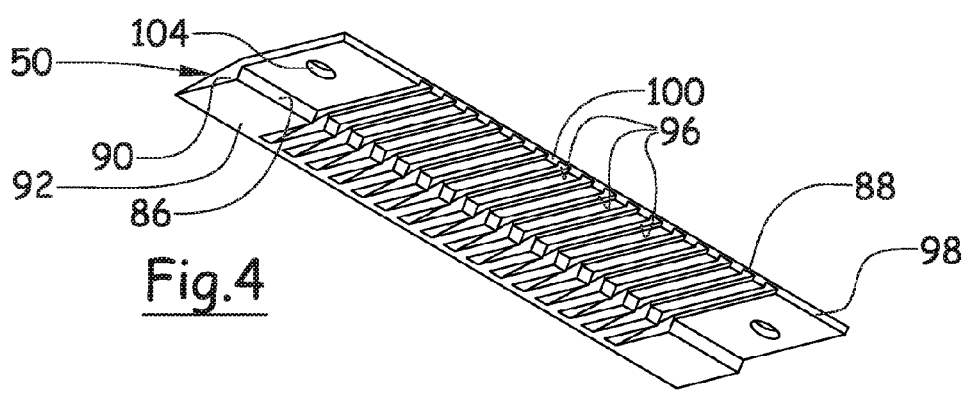
Figure 5:
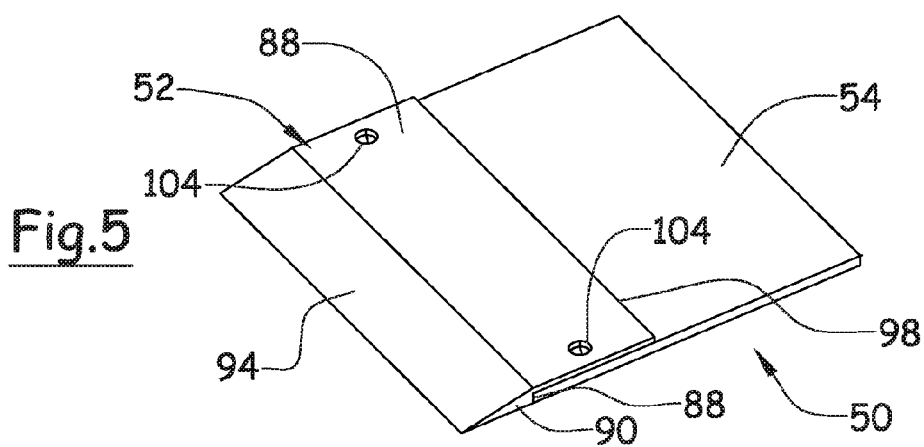
Figure 6:
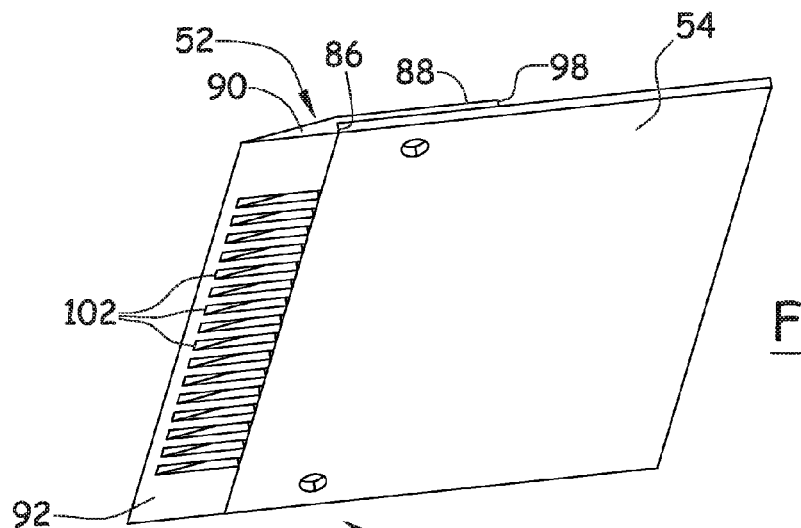
Figure 7:
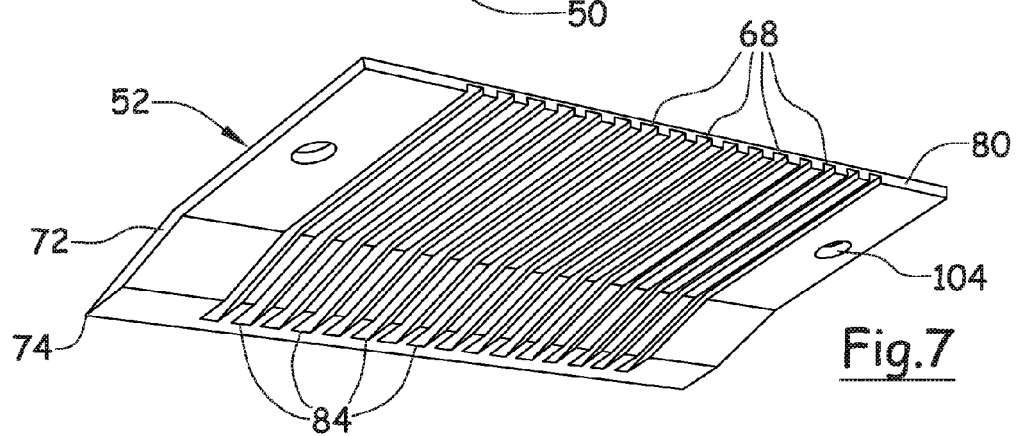
Figure 8:
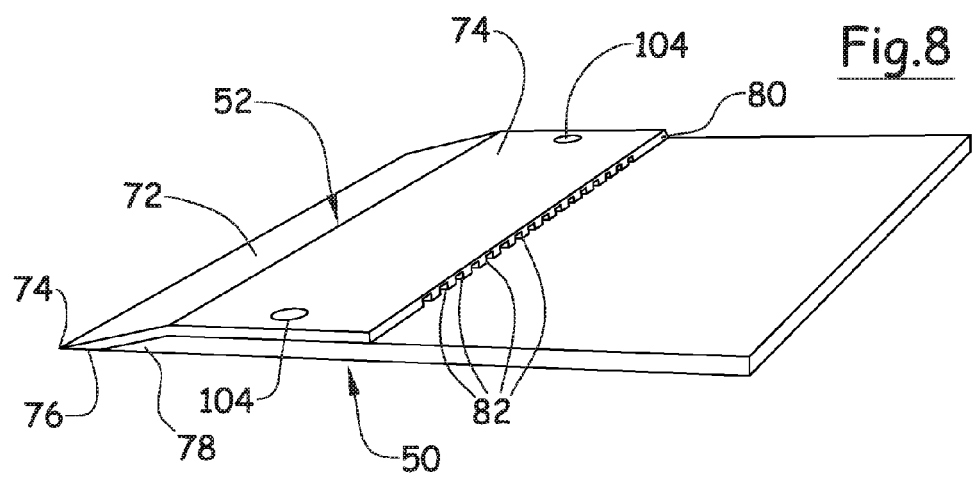
Figure 9:
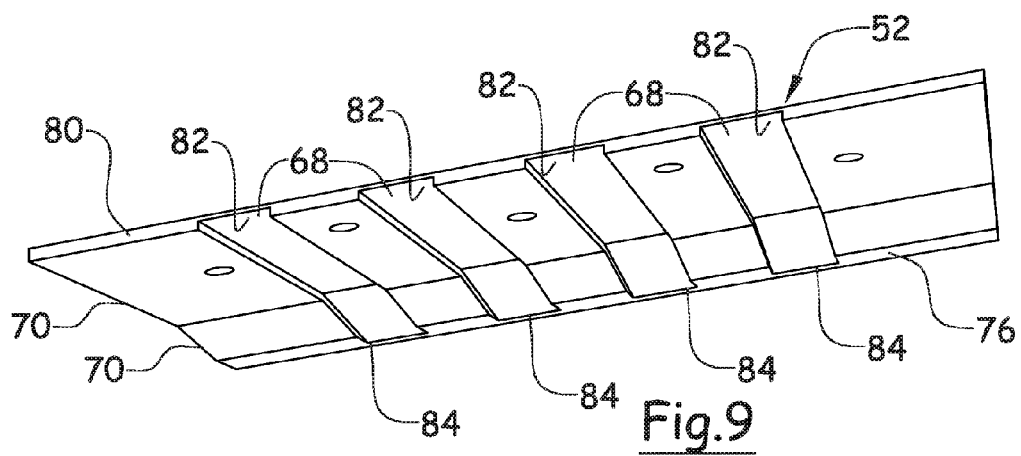
Figure 10:
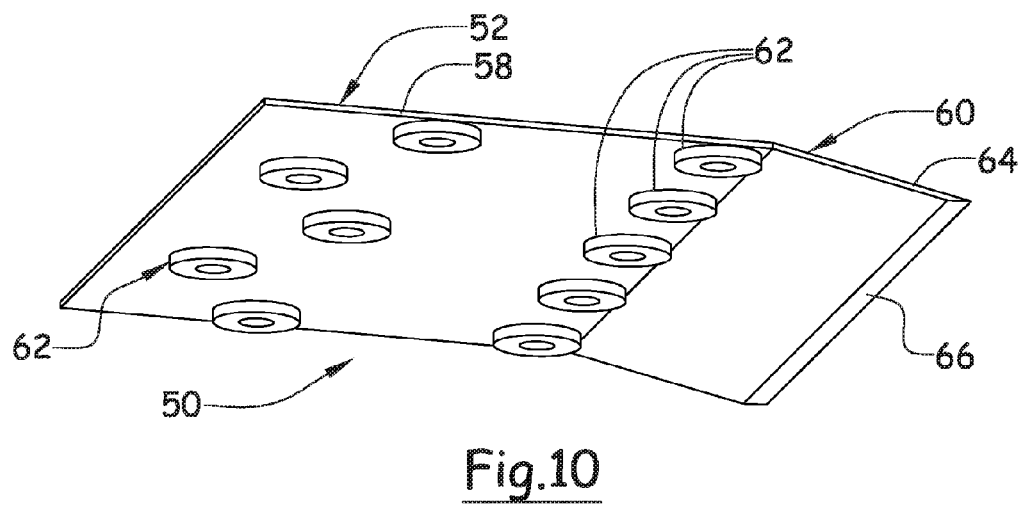
Figure 11:
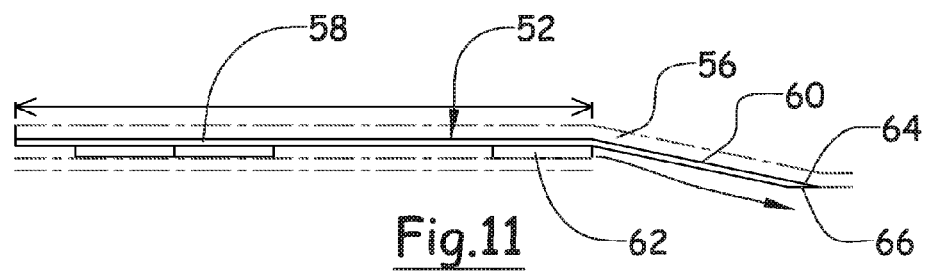
Figure 13:
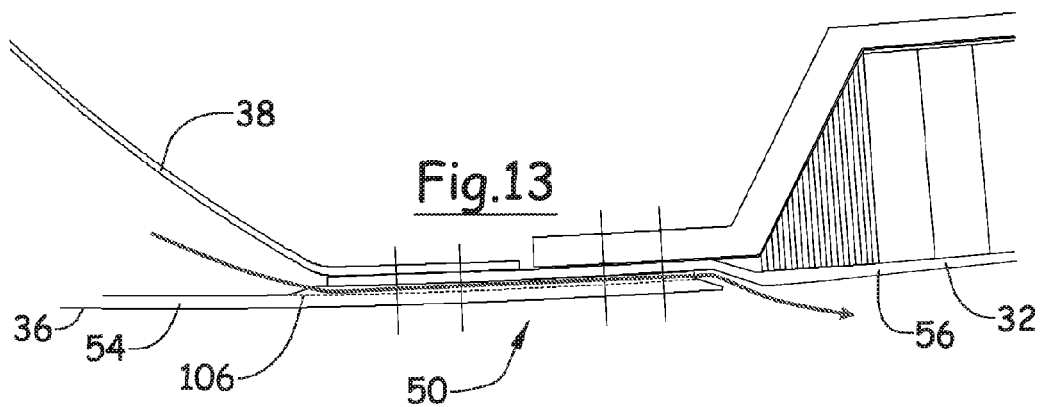
Figure 14:
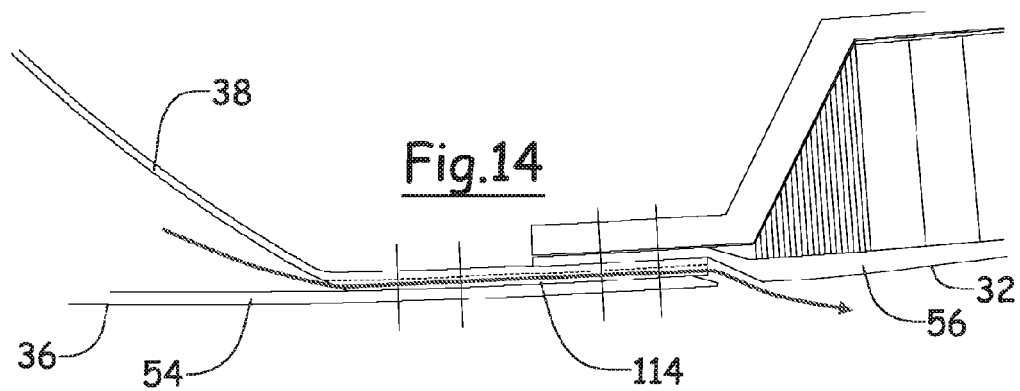
Figure 15:
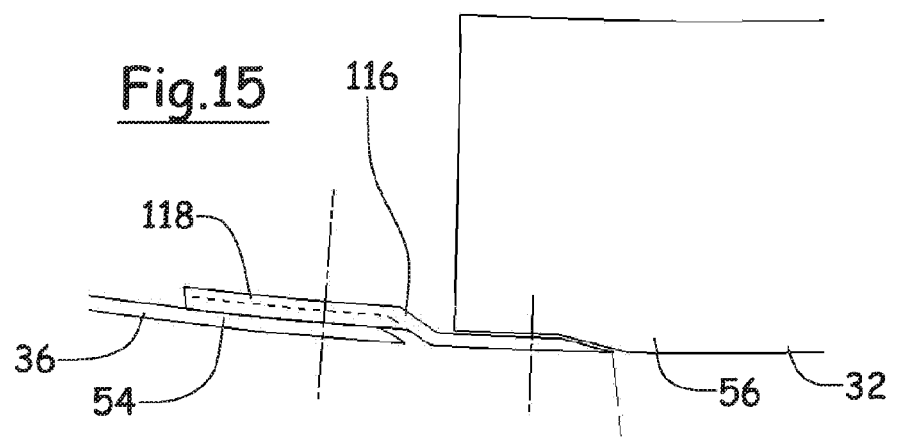
Figure 16:
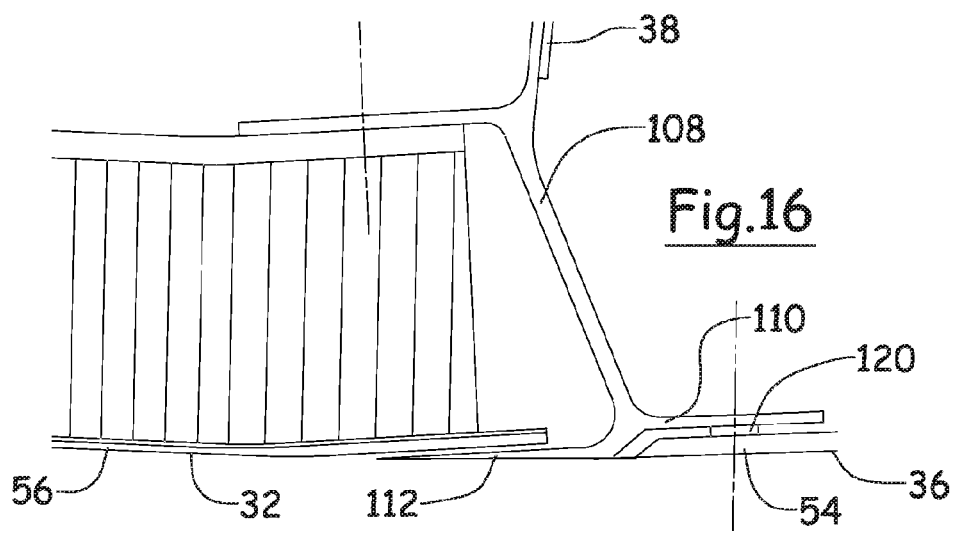
Figure 17:
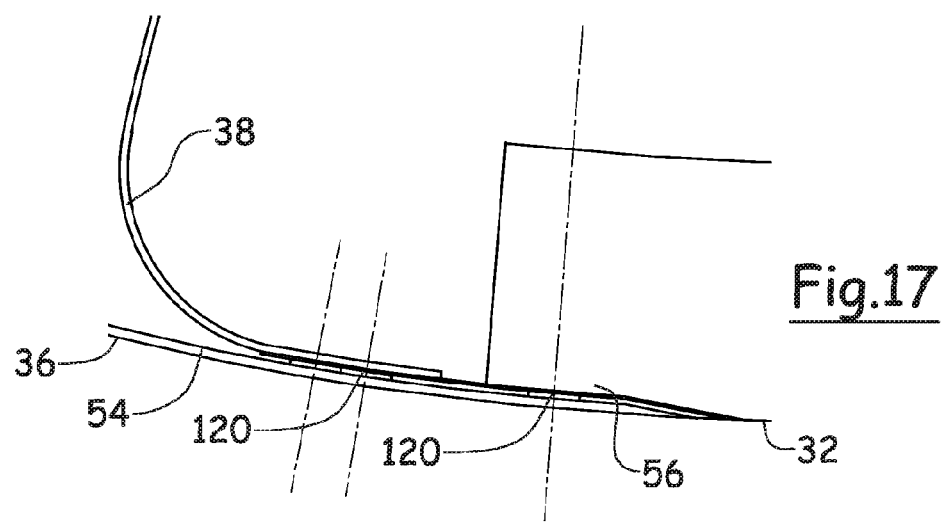

Other characteristics and advantages will emerge from the following description of the invention, a description that is provided only by way of example relative to the accompanying drawings, in which:

FIG. 1 is a cutaway of the front of a nacelle according to the prior art,

FIG. 2 is a cutaway that illustrates in detail the system for discharging hot air according to the invention, FIG. 3 is a cutaway of the front of a nacelle that shows the position of the front frame according to the prior art and according to the invention as well as the limits of de-icing and zones treated acoustically, FIG. 4 is a perspective view that illustrates a block of the discharge system according to the invention, FIG. 5 is a perspective view of the block of FIG. 5 attached to the panel that forms the lip, FIG. 6 is a perspective view that illustrates the block of FIG. 5 that illustrates the output ports of the discharge system, FIG. 7 is a perspective view of a block according to another variant, FIG. 8 is a perspective view that illustrates the block of FIG. 7 that is attached to the panel that forms the lip, FIG. 9 is a perspective view of a block according to another variant of the invention, FIG. 10 is a perspective view of a block according to another variant of the invention, FIG. 11 is a lateral view of the block of FIG. 10, FIGS. 12 to 14 are cutaways that illustrate different variants of a discharge system according to the invention without a block, FIG. 15 is a cutaway that illustrates a variant of the invention with two successive junctions, on the one hand between a panel that forms the lip and a block, and, on the other hand between said block and a panel that forms the pipe, and FIGS. 16 and 17 are cutaways that illustrate variants of the discharge system according to the invention with washers that are inserted between two panels at the junction zone.

In FIGS. 2 and 3, a nacelle that comprises a pipe 32, a peripheral wall 34 as well as a lip 36 toward the front connecting said pipe 32 and said peripheral wall 34 and that delimits an air intake is shown at 30. The other elements of the nacelle are not described because they are known to one skilled in the art.

Generally, the wall of the pipe (or the lip) is obtained by the assembly of several panels, several plates, several skins or the like. Hereinafter, all of these wall forms will be referred to by the term panel.

The structure of the nacelle 30 comprises a front frame 38 that connects the peripheral wall 34 and the pipe 32 and that supports the lip 36. The frame is not presented in more detail because it is also known to one skilled in the art.

The front frame 38 comprises a first edge that is arranged at the junction of the peripheral wall 34 and the lip 36, and a second edge that is arranged at the junction of the pipe 32 and the lip 36.

At the first edge, the front frame 38 comprises a support surface 40 at which the peripheral wall 34 and/or the lip 36 are made integral.

According to one embodiment, to reduce the effect on the drag, the panels of the peripheral surface and the lip are put end to end and do not overlap and are both made integral on the support surface 40.

At the second edge, the front frame 38 comprises a support surface 42 at which the pipe 32 and/or the lip 36 are made integral.

According to one embodiment, the wall of the lip 36 is made integral with the support surface 42 and the ends of the walls of the pipe and the lip opposite overlap and are made integral by any suitable means. To reduce the effect on the drag, the panel of the pipe (or the panel of the lip) comprises an offset whose height is adapted to the thickness of the panel of the lip (or respectively the panel of the pipe) so that the aerodynamic surfaces of the two panels on both sides of the overlapping zone are arranged in the same plane.

In general, a zone at which two elements, and, more particularly two panels or panel parts, are superposed is called a junction zone. This invention relates more particularly to the junction zones between two elements that each comprise a surface that forms the outside surface of the nacelle on both sides of the junction zone.

Hereinafter, the inside of the nacelle is defined as the zone of the nacelle that is delimited by the peripheral wall, the lip, and the pipe that is not in contact with the aerodynamic flows that flow to the outside of the aircraft, whereby the outside of the nacelle corresponds to the additional zone at which the aerodynamic flows circulate, namely those in contact with the outside surface of the peripheral wall or with the outside surface of the pipe inside of which flows the air stream that is designed for the gas turbine engine.

So as to reduce noise pollution, the pipe 32 comprises a coating 44 for the acoustic treatment, comprising—from the inside to the outside—a reflective layer, at least one alveolar structure, and at least one acoustically resistive structure. The coating for the acoustic treatment is not presented in detail because it is also known to one skilled in the art. In general, the acoustically resistive structure that forms the aerodynamic surface is made of composite material.

To improve the acoustic treatment, the lip can also comprise an acoustic coating 46.

The junction zones—on the one hand between the front frame and the lip, and on the other hand between the lip and the pipe—are zones that are not treated acoustically because of said elements overlapping.

The nacelle also comprises a frost treatment system at lip 36.

This invention relates more particularly to the nacelle that integrates a system for treatment of the frost by hot air. In this case, means are provided for blowing in hot air inside the lip so that the latter, in contact with the inside surface of the lip, prevents the formation of frost or its accumulation at the outside surface of the lip.

According to one embodiment, hot air is sampled at the power plant and conduits are provided to convey it into the space that is delimited by the front frame and the lip. These different elements are not described in more detail because they are known to one skilled in the art.

Advantageously, means are provided to channel the hot air in the vicinity of the inside surface of the lip so as to reinforce the effectiveness of the frost treatment. According to one embodiment that is described in Patent Application FR-070055586, channels 48 are interposed between the alveolar structure and the acoustically resistive structure of the coating for the acoustic treatment.

The nacelle comprises means 50 making it possible to discharge the hot air that is used for the treatment of frost outside of said nacelle.

According to the invention, these means 50 for discharging hot air are provided at the junction zone and are inserted between two elements that form the junction zone. According to the invention, the means 50 for discharging the hot air comprise at least one projecting and/or hollow shape that is arranged between the two elements of the junction zone making it possible to provide a passage between said elements so as to link the inside and the outside of the nacelle and to allow the flow of the hot air from the inside of the nacelle to the outside.

The fact of providing discharge means to the right of the junction zone makes it possible to reduce the untreated surface and to optimize the acoustic treatment, whereby the surface that is occupied by the discharge means is not added to the surface of the junction zones.

According to the invention, the element that is arranged toward the outside at the junction zone is not deformed at the junction zone and does not comprise any bulge that can generate aerodynamic disturbances. As appropriate, either the thickness of at least one of the two elements is reduced so as to form one or more grooves at the contact surface of said two elements at the junction zone, or the element that is arranged toward the inside at the level of the junction zone is deformed toward the inside so as to make it possible to add the projecting shape at contact surfaces or at least one added element.

According to a significant characteristic of the invention, the discharge means have suitable shapes that make it possible to eject the hot air in a direction that is not parallel to the outside surface of the nacelle so as to mix it with the aerodynamic flows that circulate in the pipe and to cool it.

Advantageously, the direction of the flow of ejected hot air forms an angle with the outside surface that varies from 5 to 60°. Preferably, the angle is between 5 and 30° to obtain a good compromise between the cooling of hot air and the disturbances of the aerodynamic flow that circulates in the pipe.

According to an important point of the invention, the element that is arranged on the inside at the level of the junction zone comprises an inclined face between the zone at which the outside surface of said element is flattened against the inside surface of the other element and the zone at which the outside surface of said element forms the outside surface of the nacelle, whereby said inclined face makes it possible to orient the flow of hot air in a direction that is not parallel to the outside surface of the nacelle.

According to one embodiment, the discharge means are provided over the entire circumference of the pipe of the nacelle, or along one or more portions of the circumference.

According to one improved embodiment, the angle of ejection of hot air cannot be constant along the circumference. Thus, based on the position of the discharge means over the circumference of the pipe, the ejection angle can be optimized.

According to one embodiment, the discharge means comprise at least one block 52 with at least one projecting and/or hollow element that is arranged between the two elements of the junction zone.

According to a preferred embodiment, the block 52 comprises a portion that is inserted between the panel 54 of the lip 36 and the panel 56 of the pipe 32, whereby the support surface 42 of the front frame 38 is arranged to the right of the overlapping zone of said panels 54 and 56, as illustrated in detail in FIG. 2.

This configuration makes it possible also to improve the acoustic treatment because the junction zones between the front frame 38, the lip 36, the pipe 32 and the discharge means 50 are superposed, which also reduces the untreated surfaces.

This configuration also makes it possible to optimize the frost treatment because the discharge means 50 are not provided in an offset manner toward the front (according to the direction of flow of the aerodynamic flows) relative to the front frame 38.

According to another advantage, the discharge system no longer comprises perforations or micro-perforations, which contributes to considerably increasing its service life because there are no longer possible risks of tearing under the pneumatic pressure.

This configuration also has the advantage of driving the air to be discharged through this discharge system, which greatly improves the de-icing of the lip.

As illustrated in FIG. 3, this configuration optionally makes it possible to offset the front frame, which has the advantage of inclining it and therefore imparting a greater shock resistance to the lip.

Advantageously, the discharge means 50 comprise a block 52 with a first portion 58 that is inserted between the superposed panels and a second portion 60 to the right of a single panel, the one that is arranged inside at the level of the junction zone, corresponding to the pipe panel 32. This configuration makes it possible to protect the panel that forms the pipe 32 that is generally made at least in part from composite material.

According to a first variant that is illustrated in FIGS. 10 and 11, the discharge means 50 comprise a block 52 and pins 62 that are provided at least one of the surfaces of the block, constituting projecting elements that allow the passage of hot air from the inside to the outside. Advantageously, according to this embodiment, the block 52 comprises a first portion 58 at which pins 62, inserted between the panels 54 and 56, and a second portion 60, in contact only with the panel 56 of the pipe 32, are connected. The pins 62 are arranged on the surface of the block 52 opposite the panel 54 of the lip so that the hot air is in contact only with said panel 54 so as to extend the frost treatment and to protect the panel 56 of the inside pipe that is generally made at least in part from heat-sensitive composite material.

Advantageously, the second portion 60 is inclined relative to the first part 58 so that the free end 64 of the second portion 60 is arranged at the aerodynamic surface of the panels that form the lip and the pipe. Preferably, the free end 64 comprises a beveled shape so as to obtain an edge 66 whose surface is arranged at the aerodynamic surface of the panels that form the lip and the pipe 32.

The second inclined portion 60 makes it possible to eject the hot air outside of the nacelle with the effect that it mixes with the aerodynamic flows that circulate in the pipe and it cools down.

To ensure the passage of hot air, the first portion 58 extends over the entire length L of the superposition zone of the panels 54 and 56.

According to another variant that is illustrated in FIGS. 4 to 9, the discharge means 50 comprise a plate 52, called a block, with at least one groove 68 on at least one of the surfaces of the block 52, making possible the passage of hot air from the inside of the nacelle to the outside.

According to one embodiment that is illustrated in FIGS. 7 to 9, the plate 52 comprises a first portion 70, inserted between the panels 54 and 56, extending at least over the length of the superposition zone of said panels 54 and 56, and a second portion 72 that is inclined relative to the first portion 70 such that the free end 74 of the second portion 72 is arranged at the aerodynamic surface of the panels 54 and 56 forming the lip and the pipe 32.

Preferably, the free end 74 comprises a beveled shape so as to obtain an edge 76 whose surface is arranged at the aerodynamic surface of the panels that form the lip and the pipe 32.

Preferably, the panel 54 of the lip 36 comprises an end 78 with a beveled shape so as to obtain an edge whose surface is parallel to the surface of the second portion 72 of the plate 52.

The block 52 comprises grooves 68 only at the surface opposite the panel 54 of the lip 36. Thus, the hot air is channeled between the block 52 and the panel 54 of the lip 36, which makes it possible to protect the panel 56 from the pipe 32 that is generally made at least in part from heat-sensitive composite material.

The grooves 68 can have a more or less significant width, as illustrated in FIGS. 7 and 9.

The grooves 68 have a height that is less than the thickness of the plate 52 and extend from a first edge 80 to a second edge 76.

Thus, the grooves 68 emerge, on the one hand, at the edge 80 via ports 82 that communicate with the inside of the nacelle, and, on the other hand, at the edge 76 via the ports 84 that communicate with the outside of the nacelle.

Whereby the second portion is inclined, the bottom of the groove 68 is also inclined at said second part, which makes it possible for the hot air to be ejected outside of the nacelle with the effect that it is mixed with the aerodynamic flows that circulate in the pipe and it cools down.

According to another embodiment that is illustrated in FIGS. 4 to 6, the plate or block 52 comprises a shoulder 86 of a height that is approximately equal to the thickness of the panel 54 of the lip, which delimits a first portion 88 in the form of a plate of small thickness that is inserted between the two panels 54 and 56, extending at least over the length of the superposition zone of said panels 54 and 56, and a second beveled-shape portion 90 with an edge 92 whose surface is arranged at the aerodynamic surface of the panels forming the lip and the inside pipe and an inclined face 94 against which the panel 56 of the pipe 32 is flattened.

The block 52 comprises grooves 96 only at the face opposite the panel 54 of the lip 36. Thus, the hot air is channeled between the block 52 and the panel 54 of the lip 36, which makes it possible to protect the panel 56 from the pipe 32 that is generally made at least in part from heat-sensitive composite material.

The grooves 96 can have a more or less significant width.

The grooves 96 have a height that is less than the thickness of the plate 52 and extend from a first edge 98 up to the second edge 92.

Thus, the grooves 96 emerge, on the one hand, at the edge 98 via ports 100 that communicate with the inside of the nacelle, and, on the other hand, at the edge 92 via ports 102 that communicate with the outside of the nacelle.

As above, whereby the second portion is inclined, the bottom of the grooves 68 is also inclined at said second part, which makes it possible for the hot air to be ejected outside of the nacelle with the effect that it mixes with the aerodynamic flows that circulate in the pipe and it cools down.

According to the different variants, the plates or blocks 52 are kept in place by any suitable means. According to one embodiment, ports 104 can be provided to allow the passage of screws or rivets.

Figure 12:
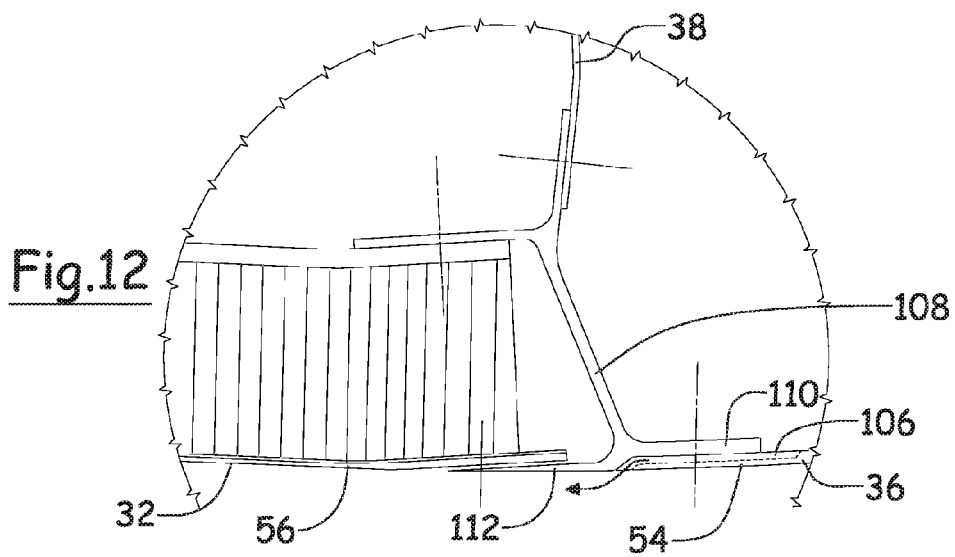

In FIGS. 12 and 13, discharge means 50 comprise projecting and/or hollow shapes 106 that are made directly on the panel 54 that forms the lip 36. According to one embodiment, the inside surface of the panel 54 comprises grooves 106 that extend over the entire junction zone and that communicate at a first end with the inside of the nacelle and at a second end with the outside of the nacelle.

According to one embodiment that is illustrated in FIG. 13, the panel 56 extends between the front frame 38 and the panel 54 that forms the lip at the junction zone.

According to another embodiment that is illustrated in FIG. 12, an intermediate piece 108 is provided to connect the panel 54 that forms the lip, the panel 56 that forms the pipe 32, and the front frame 38. This intermediate piece 108 comprises two branches, a first branch 110 that is flattened against the inside surface of the panel 54 that forms the lip 36 and a second branch 112 that is flattened against the outside surface of the panel 56 that forms the pipe 32. According to this variant, the discharge means 50 are arranged between the panel 56 and the intermediate part 108. As appropriate, the projecting and/or hollow shapes can be made at the surface of the branch 110 of the intermediate piece 108 in contact with the inside surface of the panel 54 and/or said shapes can be made at the inside surface of the panel 54 that is in contact with the branch 110 of the intermediate piece 108.

According to another variant that is illustrated in FIG. 14, the front frame 38 extends between the panel 54 that forms the lip 36 and the panel 56 that forms the pipe 32. According to one embodiment, the discharge means 50 comprise projecting and/or hollow shapes 114 that are made directly at the surface of the front frame 38 that is in contact with the panel 54, whereby said hollow and/or projecting shapes extend over an adequate length for linking the inside of the nacelle, in particular the zone that is delimited by the front frame and the lip, with the outside of the nacelle.

FIG. 15 shows another variant, in which a piece of sheet metal or a plate 116 ensures the junction between the panel 54 that forms the lip 36 and the panel 56 that forms the pipe 32. Thus, this embodiment comprises a first junction zone between the panel 54 and the plate 116 and a second junction zone between the plate 116 and the panel 56. According to one embodiment, the discharge means 50 comprise projecting and/or hollow shapes 118 that are interposed between the panel 54 and the plate 116. As appropriate, the projecting and/or hollow shapes 118 are made at the surface of the plate 116 that is in contact with the panel 54, or at the level of the inside surface of the panel 54 that is in contact with the plate 116.

According to other embodiments that are illustrated in FIGS. 16 and 17, the discharge means 50 comprise a plurality of elements 120 that are arranged between the elements of a junction zone, in particular in the form of washers.

Thus, as illustrated in FIG. 16, the washers 120 are interposed between the branch 110 of an intermediate part 108 and the panel 54 of the lip 36.

As illustrated in FIG. 17, the washers 120 are interposed between the front frame 38 and the panel 54 that forms the lip 36 and between the panel 56 that forms the pipe 32 and the panel 54 that forms the lip 36.

Of course, the invention is not limited to the embodiments that are illustrated in the different figures, whereby the projecting and/or hollow shapes of the discharge means are provided directly on at least one of the pieces that form the junction zone and/or on an insert, called a block, arranged between the two pieces that form the junction zone.

The invention claimed is:

1. Aircraft nacelle that comprises:
   discharge means (50) linking an inside of the nacelle with an outside of the nacelle; and
   a junction zone between two superposed panel elements (54, 56) at a level of which the two panel elements are superposed, wherein,
   the two panel elements each have a surface that forms an outside surface of the nacelle on both sides of the junction zone, and
   said discharge means (50) comprises a two-part block (52) comprised of
   i) a first part (58, 70, 88) that is inserted between the superposed two panel elements and that comprises at least one projecting and/or hollow element to provide a passage between said two panel elements so as to link the inside and the outside of the nacelle, and
   ii) a second part (60, 72, 90) to one side of a single panel (56) of the two panel elements, the single panel (56) arranged inside at the level of the junction zone so as to be protected from an excessive temperature.

2. Aircraft nacelle according to claim 1, wherein the direction of flow of ejected hot air forms an angle with the outside surface that varies from 5 to 30°, optimized for achieving a good compromise between cooling of the hot air and disturbances of aerodynamic flow that circulates in the pipe.

3. Aircraft nacelle according to claim 1, wherein the single panel (56) that is arranged inside of an interior of the nacelle at the level of the junction zone comprises an inclined face between the zone at which the outside surface of said single panel is flattened against the inside surface of another panel (54) of the two panel elements and the zone at which the outside surface of said single panel (56) forms the outside surface of the nacelle, whereby said inclined face orients a flow of hot air in a direction that is not parallel to the outside surface of the nacelle.

4. Aircraft nacelle according to claim 1, wherein the second part (60, 72, 90) comprises a beveled shape so as to obtain an edge (66, 76, 92) whose surface is arranged at an aerodynamic surface of the two panel elements (54, 56).

5. Aircraft nacelle according to claim 1, wherein the block (52), of the discharge means (50), comprises pins (62) that are provided at at least one surface of said block, constituting projecting elements that allow the passage of air from the inside to the outside.

6. Aircraft nacelle according to claim 1, wherein the block (52), of the discharge means (50), comprises at least one groove (68, 96) on at least one surface of said block, the at least one groove providing for the passage of air from the inside of the nacelle toward the outside.

7. Aircraft nacelle according to claim 6, wherein the grooves (68, 96) emerge i) at a first edge (80, 98) via ports (82, 100) that communicate with the inside of the nacelle, and ii) at a second edge (76, 92) via ports (84, 102) that communicate with the outside of the nacelle.

8. Aircraft nacelle according to claim 6, wherein the block (52) comprises a shoulder (86) of a height that is approximately equal to a thickness of a first panel (54), which delimits a first part (88) in the form of a plate inserted between the two two panel elements (54, 56), extending at least over the length of the superposition zone of said two panel elements (54, 56), and a second beveled-shape part (90) with an edge (92) whose surface is arranged at aerodynamic surfaces of said two panel elements (54, 56) and an inclined face (94) against which the second panel (56) is flattened, and wherein the block (52) comprises grooves (96) only at surface opposite the first panel (54).

9. Aircraft nacelle that comprises:
   an inside pipe (32) formed from a panel (56),
   an outside surface (34) of a peripheral wall,
   a front lip (36) that connects said inside pipe (32) and said outside surface (34) delimiting an air intake,
   a front frame (38) that connects said outside surface (34) and said inside pipe (32), said front frame (38) supporting supports said lip (36),
   a de-icing system that uses hot air that is blown inside said lip (36), and
   means (50) for discharging hot air according to claim 1, said means (50) for discharging hot air inserted between the panel (56) that forms the inside pipe (32) and the panel (54) that forms the lip (36).

10. Aircraft nacelle according to claim 2, wherein the single panel (56) that is arranged inside of an interior of the nacelle at the level of the junction zone comprises an inclined face between the zone at which the outside surface of said single panel is flattened against the inside surface of another panel (54) of the two panel elements and the zone at which the outside surface of said single panel (56) forms the outside surface of the nacelle, whereby said inclined face orients a flow of hot air in a direction that is not parallel to the outside surface of the nacelle.

11. Aircraft nacelle according to claim 2, wherein the second part (60, 72, 90) comprises a beveled shape so as to obtain an edge (66, 76, 92) whose surface is arranged at an aerodynamic surface of the two panel elements (54, 56).

12. Aircraft nacelle according to claim 2, wherein the block (52), of the discharge means (50), comprises pins (62) that are provided at at least one surface of said block, constituting projecting elements that allow the passage of air from the inside to the outside.

13. Aircraft nacelle according to claim 2, wherein the block (52), of the discharge means (50), comprises at least one groove (68, 96) on at least one surface of said block, the at least one groove providing for the passage of air from the inside of the nacelle toward the outside.

14. Aircraft nacelle according to claim 7, wherein the block (52) comprises a shoulder (86) of a height that is approximately equal to a thickness of a first panel (54), which delimits a first part (88) in the form of a plate inserted between the two two panel elements (54, 56), extending at least over the length of the superposition zone of said two panel elements (54, 56), and a second beveled-shape part (90) with an edge (92) whose surface is arranged at aerodynamic surfaces of said two panel elements (54, 56) and an inclined face (94) against which the second panel (56) is flattened, and wherein the block (52) comprises grooves (96) only at surface opposite the first panel (54).

* * * * *

UNITED STATES PATENT AND TRADEMARK OFFICE
CERTIFICATE OF CORRECTION

PATENT NO. : 8,448,901 B2  Page 1 of 1
APPLICATION NO. : 12/745953
DATED : May 28, 2013
INVENTOR(S) : Porte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 415 days.

Signed and Sealed this
Eighth Day of September, 2015

Michelle K. Lee
*Director of the United States Patent and Trademark Office*